(12) United States Patent
Nikles et al.

(10) Patent No.: US 9,995,024 B2
(45) Date of Patent: Jun. 12, 2018

(54) MIXER TAP

(71) Applicant: NIKLES TEC ITALIA S.R.L., Carpenedolo (IT)

(72) Inventors: Gerhard Nikles, Carpenedolo (IT); Alberto Morbio, Carpenedolo (IT)

(73) Assignee: NIKLES TEC ITALIA S.R.L., Carpenedolo (IT)

( * ) Notice: Subject to any disclaimer, the term of this patent is extended or adjusted under 35 U.S.C. 154(b) by 0 days. days.

(21) Appl. No.: 15/443,139

(22) Filed: Feb. 27, 2017

(65) Prior Publication Data

US 2017/0247865 A1 Aug. 31, 2017

(30) Foreign Application Priority Data

Feb. 29, 2016 (IT) .......................... 102016000020781

(51) Int. Cl.
*E03C 1/04* (2006.01)
*F16K 11/00* (2006.01)

(52) U.S. Cl.
CPC .......... *E03C 1/0404* (2013.01); *E03C 1/0401* (2013.01); *E03C 1/0412* (2013.01); *F16K 19/006* (2013.01)

(58) Field of Classification Search
CPC .... E03C 1/0404; E03C 1/0401; E03C 1/0412; F16K 19/006
USPC ............................................................ 4/677
See application file for complete search history.

(56) References Cited

U.S. PATENT DOCUMENTS

| 6,154,897 | A | * | 12/2000 | Paini | .......................... | E03C 1/04 |
| | | | | | | 137/218 |
| 6,868,564 | B2 | * | 3/2005 | Ginter | ................... | F16K 27/045 |
| | | | | | | 4/675 |
| 8,925,572 | B2 | * | 1/2015 | Shih | .......................... | E03C 1/04 |
| | | | | | | 137/315.12 |
| 2014/0215710 | A1 | * | 8/2014 | Christ | ....................... | E03C 1/04 |
| | | | | | | 4/677 |

FOREIGN PATENT DOCUMENTS

| DE | 19639320 | 3/1998 |
| WO | 2009069157 | 6/2009 |

OTHER PUBLICATIONS

International search report for application Italian Application ITUB20161179; 8 pages; dated Oct. 6, 2016; Munich Germany.

* cited by examiner

*Primary Examiner* — Huyen Le
(74) *Attorney, Agent, or Firm* — Thomas Horstemeyer, LLP

(57) ABSTRACT

A mixer tap comprises a hollow tap body (10) made of a plastic material, a mixing cartridge (30) housed in a cartridge seat (32) made in the tap body, a cartridge support base plate (60), housed in a base plate seat (62) made in the tap body under the seat cartridge, a control cartridge seat (40) operationally connected to the mixing cartridge (30), and a water outlet tube (80) which extends from a side opening (24) of the tap body (10). The tap further comprises a shell casing (90) comprising a body portion (92) which covers the tap body (10) and a tube portion (94) which covers the water outlet tube (80).

15 Claims, 3 Drawing Sheets

MIXER TAP

CROSS-REFERENCE TO RELATED APPLICATION

This application is a continuation of and claims priority to Italian Patent Application Serial Number 102016000020781, entitled: "MIXER TAP" filed on Feb. 29, 2016, which is herein incorporated by reference in its entirety.

The present invention relates to a mixer tap.

Mixer taps for sinks, washbasins or bidets are known, comprising a tap body made of a metal material, such as brass, in which the adjustment means of the water flow and temperature are housed. Such adjustment means typically comprise a mixing cartridge connected to hot and cold water supply tubes by means of a cartridge support base plate. A command lever is mounted on the tap body which is operationally connected to the cartridge to set the water flow and temperature.

The object of the present invention is to propose a mixer tap of the type mentioned above but having a different structure, in particular lighter with the same mechanical resistance.

Another object of the invention is to provide a mixer tap which, with the same structure, allows changing its aesthetic appearance in a simple and cost-effective manner.

Said objects are achieved with a mixer tap according to claim 1. The dependent claims describe preferred embodiments of the tap according to the invention.

The features and the advantages of the mixer tap according to the invention shall be made readily apparent from the following description of preferred embodiments thereof, provided purely by way of a non-limiting example, with reference to the accompanying figures, in which.

Figure 1:
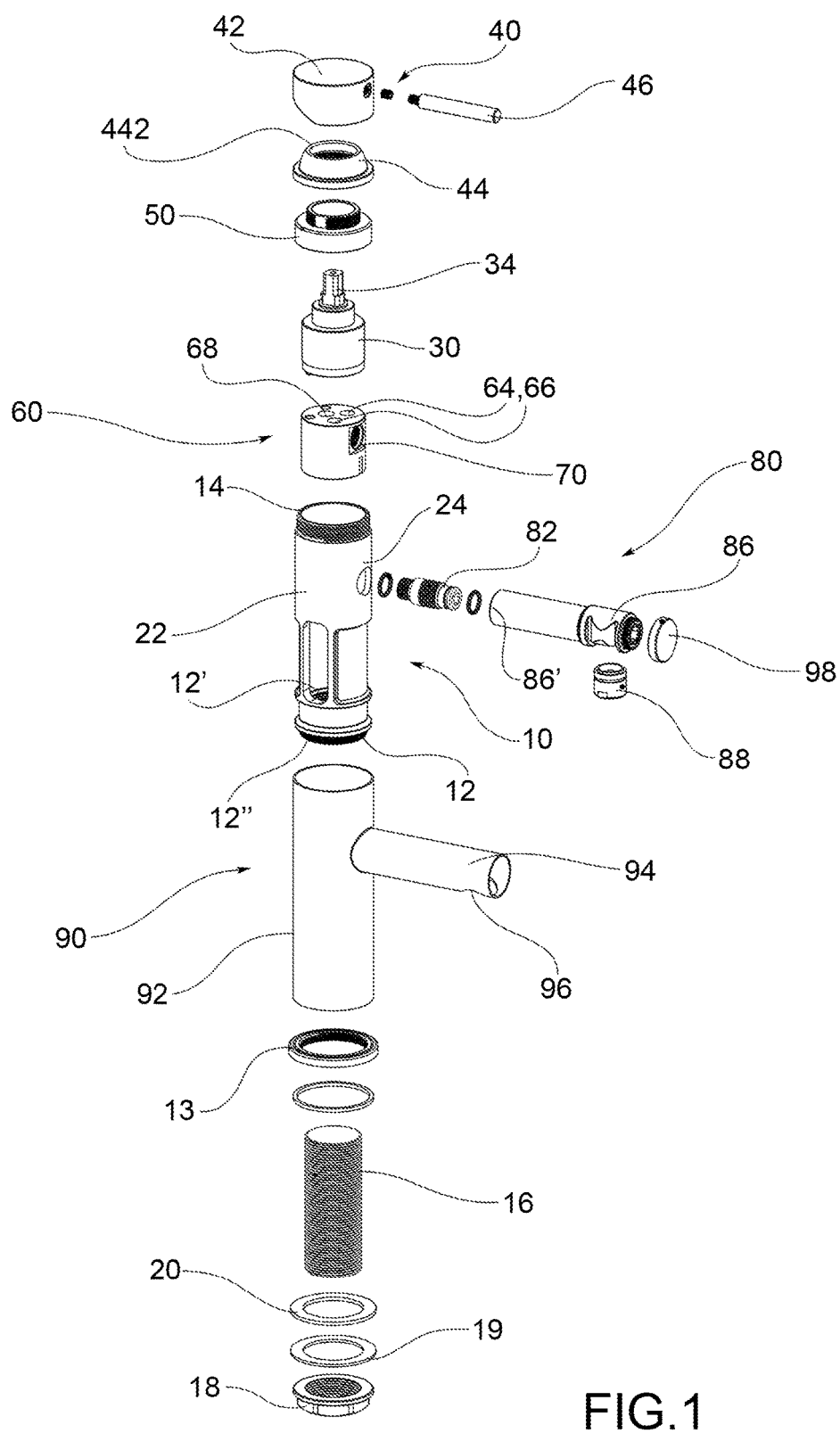
FIG. 1 is a perspective exploded view of the mixer tap according to the invention.
Figure 4:
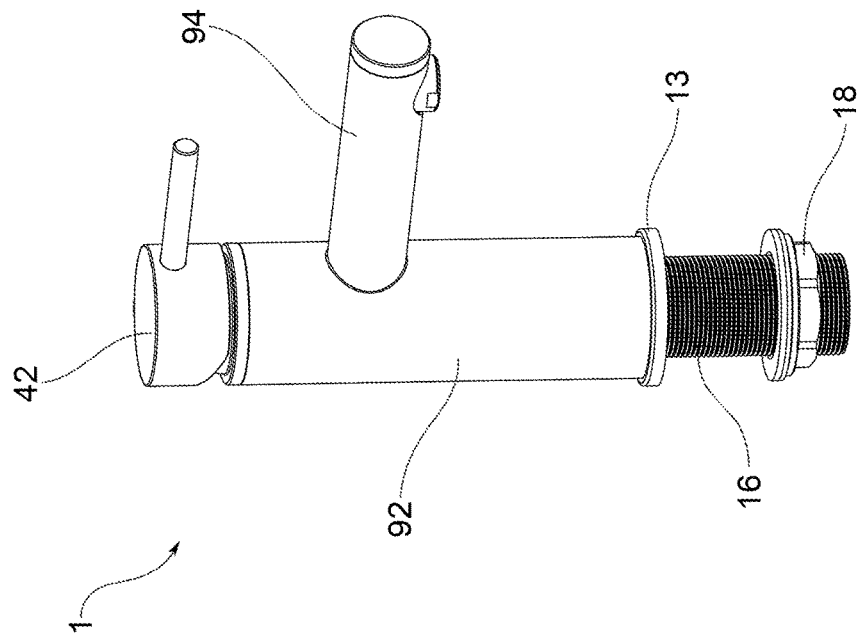
FIG. 4 is a perspective view of the assembled tap.
Figure 2:
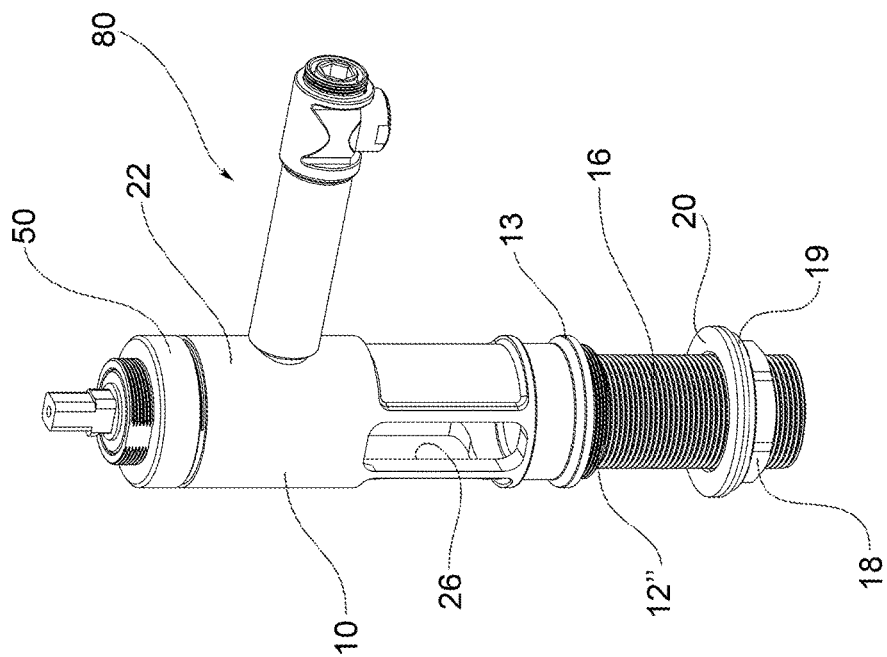
FIG. 2 is a perspective view of the tap prior to mounting the command lever and the shell casing.
Figure 5:
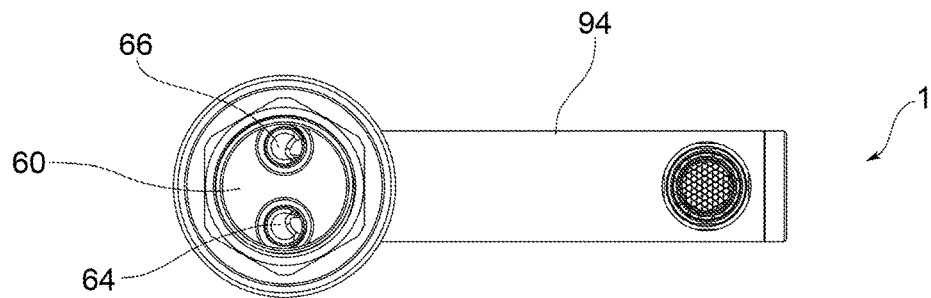
FIG. 5 is a plan bottom view of the tap.
Figure 3:
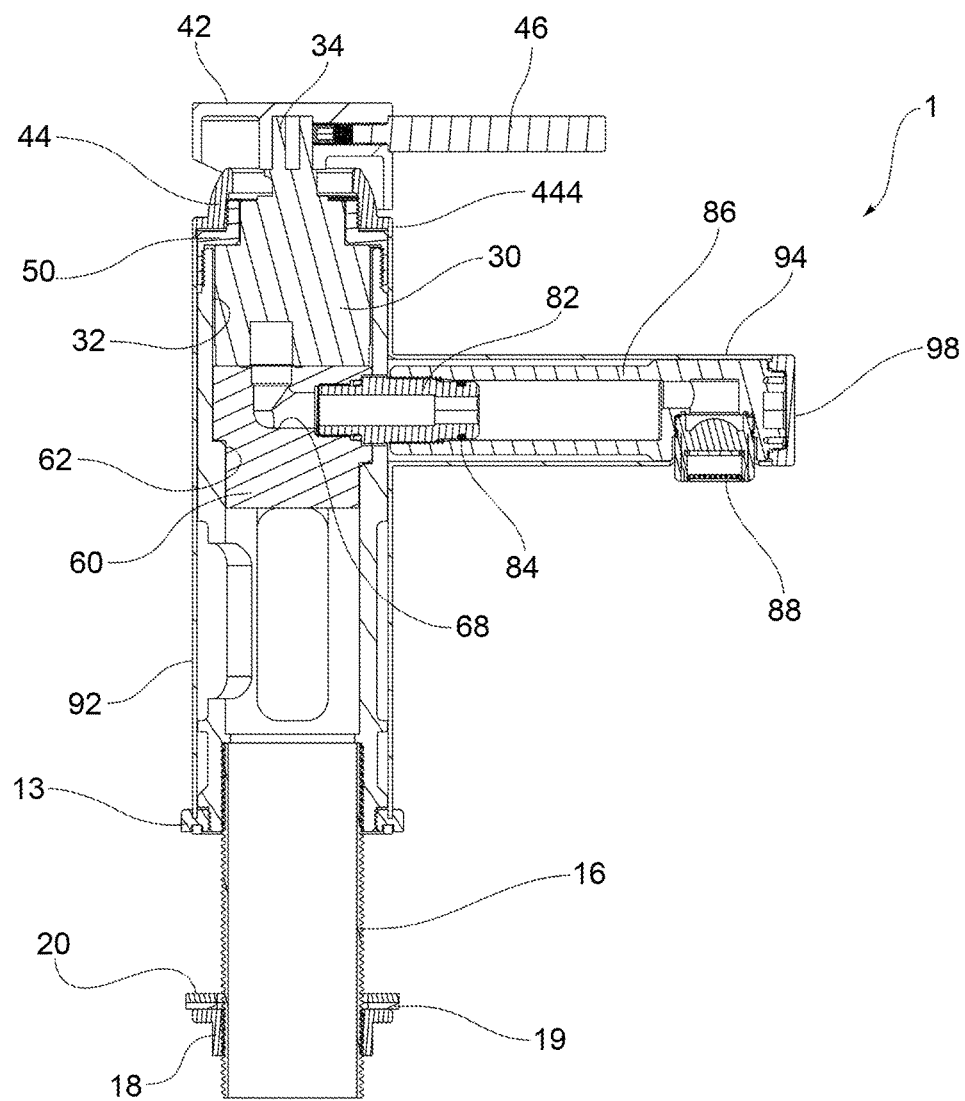
FIG. 3 is an axial section of the assembled tap.

In said drawings, reference numeral 1 indicates a mixer tap according to the invention as a whole.

In a general embodiment, the mixer tap 1 comprises a hollow tap body 10 made of a plastic material, such as PPS. The tap body 10 extends between a lower open end 12 and an upper end 14, which is also open.

The lower end 12 is suitable for being connected to fastening means for fastening the tap to a tap support surface, such as the surface of a washbasin.

For example, the lower end 12 bears an inner thread 12' to be screwed to a threaded tube 16 for mounting the tap. Moreover, the lower end 12 bears an outer thread 12" on which a washer 13 is screwed.

A locking ring 18 is screwed on the threaded tube 16 and, with the interposition of a washer 19 and a gasket 20, it cooperates with washer 13 for fastening the tap body 10 to the support surface.

The tap body 10 is delimited by a side wall 22 in which a side outlet opening 24 is made, for example of circular shape.

In one embodiment, the side wall 22 is a cylindrical wall.

Moreover, in one embodiment, lightening cavities 26 are made in a lower portion of the tap body 10, for example shaped as through windows.

A mixer cartridge 30 is housed in a cartridge seat 32 made in the tap body 10.

For example, the mixing cartridge 30 is of the type having a control rod 34 which superiorly protrudes from the tap body 10 through the upper open end 14.

The mixer cartridge 30 is operationally connected to a cartridge command lever 40.

For example, the cartridge command lever 40 is fastened to the control rod 34 of the cartridge.

In one embodiment, the command lever 40 comprises a head portion 42 rotatable on a spherical cap 44 which closes the tap body 10. A control rod 46 extends from the head portion 42. For example, the control rod 46 is screwed to the head portion 42.

In one embodiment, the control rod 46 is made in a single piece, for example chrome-plated brass.

In an embodiment variant—not shown—the control rod 46 is formed by an inner bar, for example made of brass, screwed to the head portion 42 and inserted into an outer tubular element, for example made of carbon fibre or a plastic material.

In one embodiment, the spherical cap 44 has a top opening 442 which allows the passage of the control rod 34 of the cartridge.

Moreover, in one embodiment, such a top opening 442 bears an inner thread for the fastening thereof to a cartridge ring 50 which is in turn screwed to the upper end 14 of the tap body 10 to axially lock cartridge 30 in seat 32 thereof in the cartridge body 10.

The mixer cartridge 30 is associated with a cartridge support base plate 60. The base plate 60 is housed in a base plate seat 62 made in the tap body 10 underneath the cartridge seat 32.

Inlets 64, 66 are made in the base plate 60 for the entry of hot water and cold water. Such inlets 64, 66 are connected, at one end, to respective hot and cold water supply pipes from the water mains and, at the opposite end, they fluidically communicate with the mixing cartridge 30. Moreover, an outlet 68 is made in the base plate 60 connected to the mixing cartridge 30 for receiving the water flow set from the cartridge and ending with a water 70 made in the side wall of the base plate 40 and aligned to the side outlet opening 24 of the tap body 10.

In one embodiment, the base plate 60 is made of brass.

A water outlet tube 80 extends from the side opening 24 of the tap body 10. This water outlet tube 80 is fluidically connected with the water outlet lumen 70 of the cartridge support base plate 60.

In one embodiment, the water outlet tube 80 comprises an output insert 82 connected to the outlet lumen 70.

For example, such an output insert 82 is made of a metal material, for example brass.

The output insert 82 is sealingly inserted, for example by means of at least one O-ring 84 which can also act as axial locking element, in an aerator connection pipe 86.

In one embodiment, the aerator connection pipe 86 has a proximal end 86' which rests against the side wall 22 of the tap body 10.

The aerator connection pipe 86 has a distal end 86" which supports, for example by means of a threaded connection, an aerator 88, for example facing downwards, fluidically communicating with the output insert 82.

In one embodiment, the aerator connection pipe 86 is made of a plastic material.

In one embodiment, the outlet lumen 70 of the base plate 60 has an inner thread into which a threaded end portion of the output insert 82 is screwed.

Therefore, the water flow coming out from the outlet lumen 70 enters into the output insert 82, passes through the aerator connection pipe 86 and exits from the tube through aerator 88.

The mixer tap according to the invention further comprises a body shell casing 90 comprising a body portion 92 which covers the tap body 10 and a tube portion 94 which covers the water outlet tube 80.

In one embodiment, the shell casing 90 is made of carbon fibre, or chrome-plated brass or a plastic material.

In one embodiment, the tube portion 94 of the shell is made integrally with the body portion 92.

For example, the body portion 92 of the shell extends in height between the lower 12 and upper 14 ends of the tap body 10.

For example, the body portion 92 of the shell extends in height from washer 13 to the base of the spherical cap 44.

In one embodiment, the shell casing 90 is axially locked to the tap body 10 by washer 13, on one side, and by a peripheral edge 444 to the base of the spherical cap 44. For example, the outer diameter of such a peripheral edge 444 is equal to the diameter of the body portion 92 of the shell.

Therefore, the tap body 10 is fully inserted into the body portion 92 of the shell.

In one embodiment, also the water outlet tube 80 is fully inserted into the tube portion 94 of shell 90.

In one embodiment, an aerator hole 96 is made in the tube portion 94 of shell 90 from which aerator 88 protrudes.

In one embodiment, the distal end of the tube portion 94 of shell 90 is closed by a cap 98 screwed to the end of the aerator connection pipe 86.

It is noted that, since the outlet tube 80 is made as a separate component from the tap body 10 and connected to the support base plate 60 after the latter has been inserted into the tap body, it is possible to mount the shell casing 90 provided with tube portion 94 on the tap body 10 and then insert the outlet tube 80 into the tube portion 94 and connect the outlet tube 80 to the cartridge support base plate 60.

This construction allows making the shell in one piece.

It should be noted that the shell casing has a mainly aesthetic function. The functionality of the tap is in fact already ensured by the tap body with its internal components, the outlet tube and the command lever.

By virtue of the shell casing, it is possible to make the tap in a variety of colours, effects, and/or surface finishes, as well as of lines.

A shell made of carbon fibre, moreover, gives the tap a much greater lightness, with the same resistance, compared to a conventional tap with a metal body, such as brass.

A man skilled in the art may make several changes, adjustments, adaptations and replacements of elements with other functionally equivalent ones to the embodiments of the mixer tap according to the invention in order to meet incidental needs, without departing from the scope of the following claims. Each of the features described as belonging to a possible embodiment can be obtained independently of the other embodiments described.

The invention claimed is:

1. A mixer tap, comprising:
   a hollow tap body made of a plastic material and extending between a lower open end, suitable for connection to fastening means of the mixer tap to a tap support surface and an upper open end, the tap body having a side wall in which a side outlet opening is made;
   a mixer cartridge housed in a cartridge seat made in the tap body;
   a cartridge support base plate, housed in a base plate seat made inside the tap body under the cartridge seat, hot water and cold water inlets being made in said cartridge support base plate, said hot water and cold water inlets being connectable to respective hot and cold water supply pipes fluidically communicating with the mixing cartridge, and a water outlet being made in said cartridge support base plate and being connected to the mixing cartridge and ending with a water outlet lumen made in the side wall of the cartridge support base plate and aligned with the side outlet opening of the tap body;
   a cartridge command lever operationally connected to the mixer cartridge;
   a water outlet tube which extends from the side outlet opening of the tap body and which is connected fluidically with the water outlet lumen; and
   a shell casing comprising a body portion which covers the tap body and a tube portion which covers the water outlet tube.

2. The mixer tap according to claim 1, wherein the tube portion is made in one piece with the body portion, the water outlet tube being inserted in the tube portion and connectable to the water outlet lumen after the shell has been applied to the tap body.

3. The mixer tap according to claim 1, wherein the water outlet tube comprises an output insert connected to the water outlet lumen, an aerator connection pipe in which said output insert is sealingly inserted, and an aerator attached to the distal end of said aerator connection pipe and communicating with said output insert, in the tube portion of the shell an aerator hole being made from which the aerator protrudes.

4. The mixer tap according to claim 3, wherein the output insert is made of a metal, and the aerator connection pipe is made of a plastic material.

5. The mixer tap according to claim 3, wherein the distal end of the tube portion of the shell is closed by a cap screwed to the end of the aerator connection pipe.

6. The mixer tap according to claim 1, wherein the mixer cartridge is axially locked in the tap body by a cartridge ring connected to the upper end of the tap body.

7. The mixer tap according to claim 1, wherein a spherical cap, on which the cartridge command lever is free to rotate, is connected to the cartridge ring.

8. The mixer tap according to claim 1, wherein the shell casing is made of a material selected from the group consisting of: carbon fibre, brass, and plastic material.

9. The mixer tap according to claim 1, wherein the tap body has a substantially cylindrical shape with a lower portion in which lightening cavities are made.

10. The mixer tap according to claim 1, wherein the lower end of the tap body is connected, by screwing, to a threaded tube on which a locking ring of the mixer tap to the tap support surface, is screwed.

11. The mixer tap according to claim 1, wherein the shell casing has a solely aesthetic function.

12. The mixer tap according to claim 1, wherein the tap support surface is a surface of a washbasin.

13. The mixer tap according to claim 4, wherein the output insert is made of brass.

14. The mixer tap according to claim 6, wherein the cartridge ring connected by screwing the cartridge ring to the upper end of the tap body.

15. The mixer tap according to claim 7, wherein the spherical cap is connected by screwing the spherical cap to the cartridge ring.

\* \* \* \* \*